United States Patent [19]
Myers et al.

[11] 4,172,242
[45] Oct. 23, 1979

[54] ELECTROMAGNET FOR USE WITH A BRAKE OR THE LIKE

[75] Inventors: Philip E. Myers; Edward R. Kroeger, both of Beloit, Wis.

[73] Assignee: Warner Electric Brake & Clutch Company, South Beloit, France

[21] Appl. No.: 902,296

[22] Filed: May 3, 1978

[51] Int. Cl.² .............................................. H01F 7/06
[52] U.S. Cl. .................................... 335/209; 188/138; 335/219
[58] Field of Search ............... 335/209, 278, 294, 279, 335/281, 282, 219, 220; 188/137, 138, 161, 163

[56] References Cited
U.S. PATENT DOCUMENTS

| | | | |
|---|---|---|---|
| 3,244,944 | 4/1966 | Birge | 188/138 |
| 3,476,223 | 11/1969 | Hubbard | 335/220 |
| 4,004,262 | 1/1977 | Grove | 188/138 |
| 4,004,663 | 1/1977 | Stibbe | 188/138 |

*Primary Examiner*—Harold Broome
*Attorney, Agent, or Firm*—Leydig, Voit, Osann, Mayer & Holt, Ltd.

[57] ABSTRACT

An electromagnet in which an oblong block of friction material captivates a coil on an oblong plate which is stamped from sheet metal. One pole of the magnet is formed by a stud which is secured to the plate while the other pole or poles either are formed by flanges bent from the plate or by an additional stud or studs secured to the plate.

13 Claims, 11 Drawing Figures

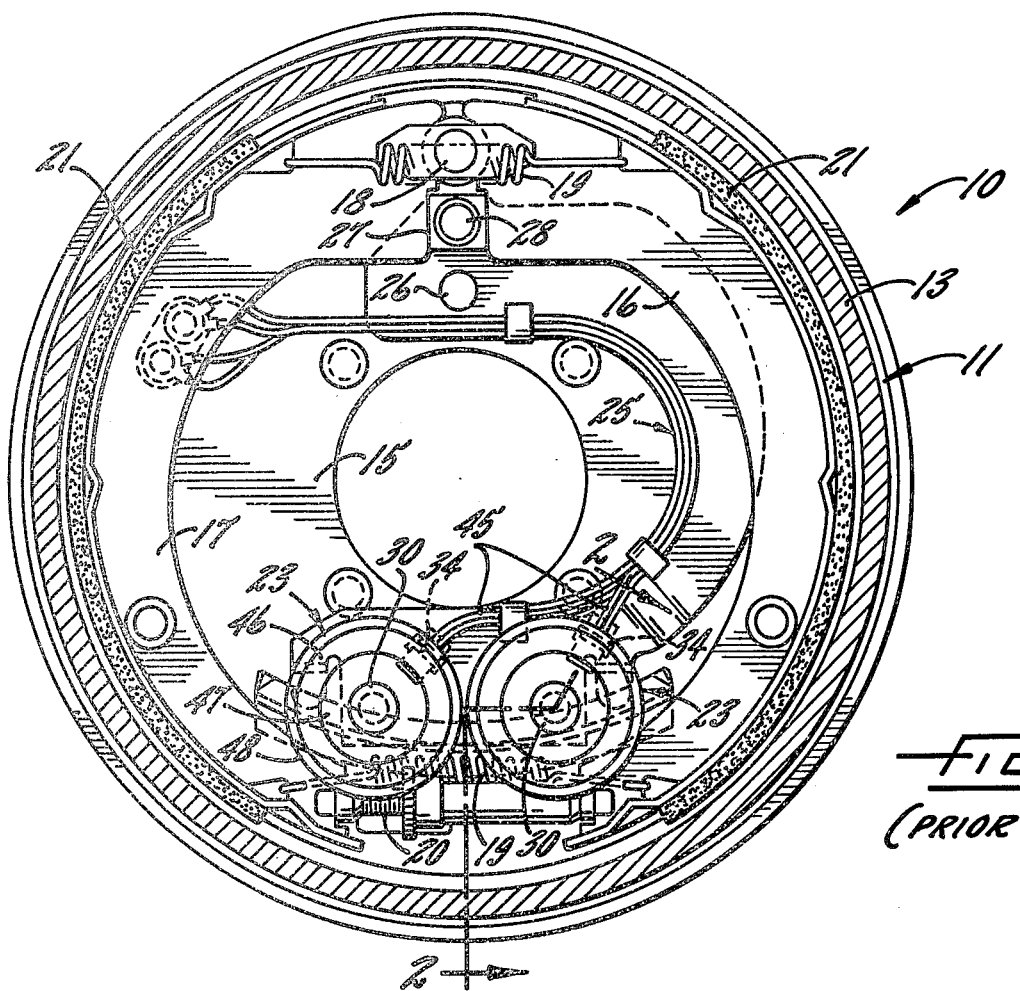
Fig. 1. (PRIOR ART)
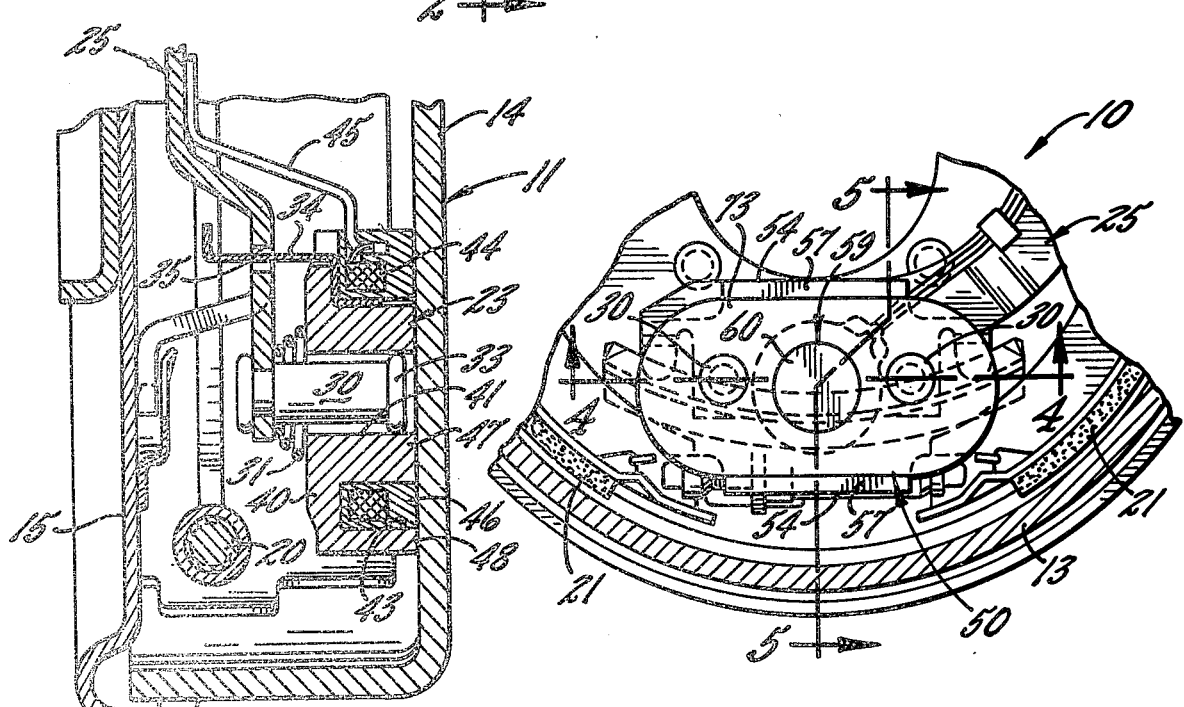
Fig. 2. (PRIOR ART)
Fig. 3.

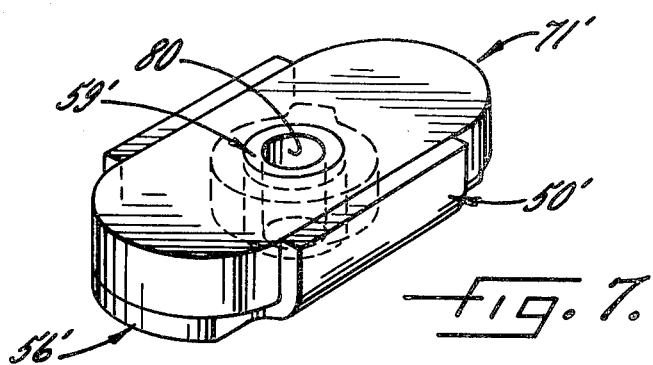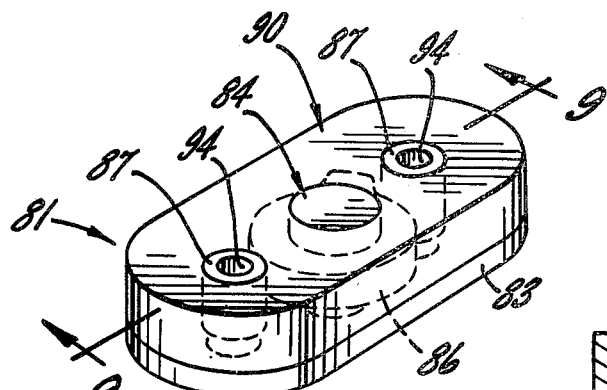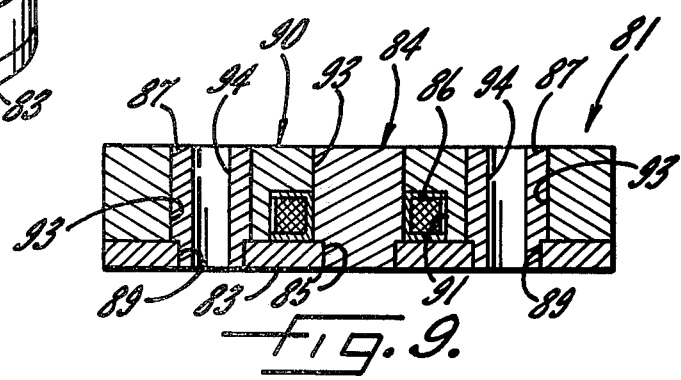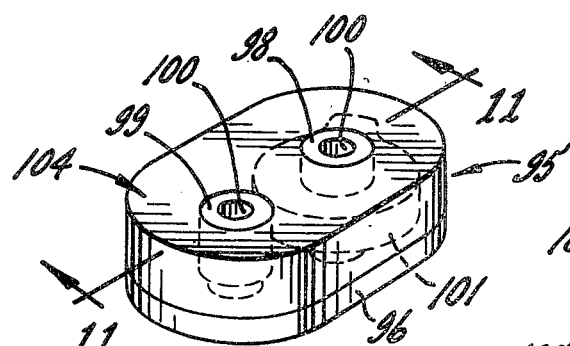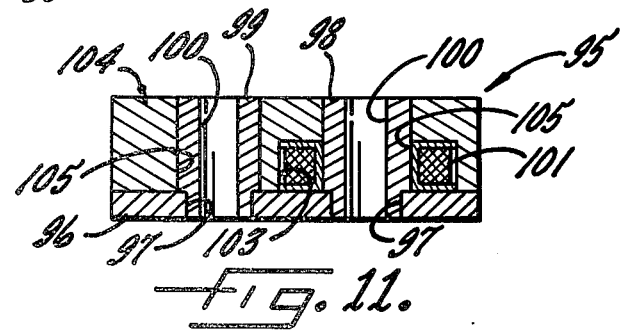

ELECTROMAGNET FOR USE WITH A BRAKE OR THE LIKE

BACKGROUND OF THE INVENTION

This invention relates to an electromagnet for use with an electrically controlled brake. While the electromagnet of the invention may be used with various types of brakes, it is particularly suitable for use in conjunction with a brake for a vehicle wheel. In such a brake, the electromagnet is mounted on a pin which is carried on the free end of a pivoted operating arm. When energized, the electromagnet frictionally engages an armature plate which rotates with and usually forms part of the drum of the vehicle wheel structure. Such frictional engagement causes the operating arm to pivot and force one or more brake shoes into engagement with the drum to apply braking torque to the wheel. In certain instances, two electromagnets are mounted in side-by-side relation on the free end of the operating arm.

Many electromagnets which are used with wheel brakes are circular in shape. Such an electromagnet usually comprises a shell made of magnetic metal and having radially spaced concentric poles of opposite polarity, the annular space between the poles being filled with a ring of non-magnetic friction material. An electric coil is located within the shell and, when the coil is excited, magnetic flux pulls the poles into frictional engagement with the armature plate. The friction ring also engages the armature and serves as the principal friction face of the electromagnet.

SUMMARY OF THE INVENTION

The general aim of the present invention is to provide a new and improved electromagnet of the foregoing type which, when compared with prior magnets, experiences more uniform wear, exhibits better performance and is simpler and less expensive to manufacture.

A related object is to provide an electromagnet in which the area of the friction face of the friction material is large as compared to the area of the pole faces of the metal poles so as to improve the performance characteristics of the magnet.

A further object is to provide a single magnet which can be used in place of two circular magnets and which, when occupying substantially the same space as two circular magnets, provides a friction face of substantially greater area.

Still another object is to reduce the cost of manufacturing the magnet by providing a magnet whose shell may be stamped from sheet metal and whose poles are formed by part of the stamping and/or by inexpensive bar stock which may be easily assembled with the stamping.

A more detailed object of the invention is to provide an electromagnet in which a simple and inexpensive circular coil is used in conjunction with a stamped shell having a substantially oblong shape and having two integrally formed and laterally extending straight poles which are located along opposite sides of a substantially oblong block of friction material.

These and other objects and advantages of the invention will become more apparent from the following detailed description when taken in conjunction with the accompanying drawings.

BRIEF DESCRIPTION OF THE DRAWINGS

FIG. 1 is a cross-section taken radially through a vehicle wheel structure having a brake assembly which utilizes two typical prior art magnets of the circular type.

FIG. 2 is an enlarged fragmentary cross-section taken substantially along the line 2—2 of FIG. 1 and showing one of the prior art magnets.

FIG. 3 is a view similar to the lower portion of FIG. 1 but shows a new and improved magnet incorporating the unique features of the present invention.

FIGS. 7 and 8 are perspective views of two additional embodiments of new magnets.

FIG. 9 is a cross-section taken substantially along the line 9—9 of FIG. 8.

FIG. 10 is a perspective view of still another embodiment of a new magnet.

FIG. 11 is a cross-section taken substantially along the line 11—11 of FIG. 10.

DETAILED DESCRIPTION OF THE PREFERRED EMBODIMENTS

Figure 4:
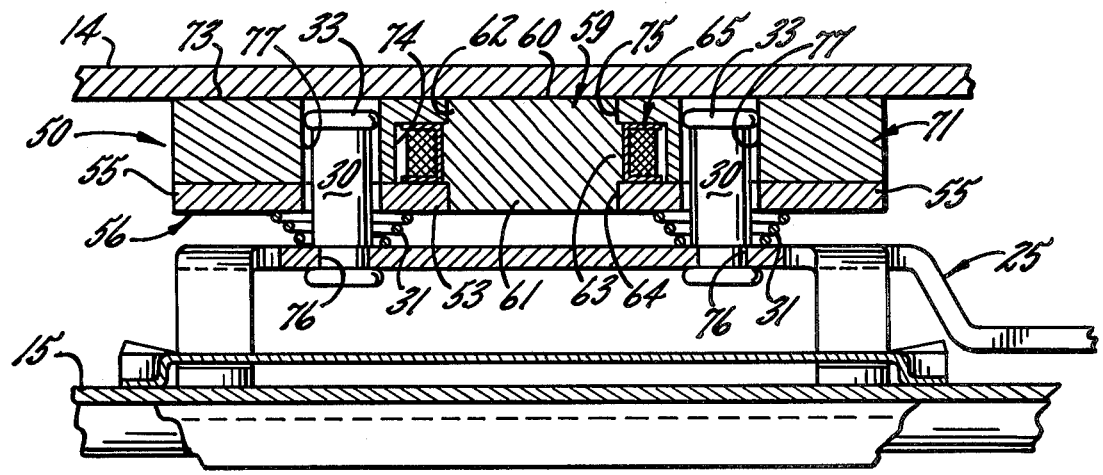
FIGS. 4 and 5 are enlarged fragmentary cross-sections taken substantially along the lines 4—4 and 5—5, respectively, of FIG. 3.

An electromagnet embodying the features of the present invention may be employed in brakes of various types but is especially adapted for incorporation in a brake assembly for selectively stopping or slowing a wheel of a vehicle such as a trailer. A full understanding and appreciation of the invention may be best gained by reference to a prior vehicle brake assembly 10 shown in FIGS. 1 and 2, that brake assembly being of the same general type as is disclosed in Stibbe U.S. Pat. No. 4,004,663. The vehicle wheel with which such a brake assembly is associated has a rotatable drum 11 comprising a cast iron flange 13 (FIG. 2) and an integral plate 14. Stationarily mounted on the vehicle is a backing plate 15 which supports the operating elements of the brake assembly.

The brake assembly 10 includes a pair of brake shoes 16 and 17 (FIG. 1) pivotally mounted on the backing plate 15 at 18 and urged to released positions by springs 19, there being an adjustment screw 20 interconnecting the lower ends of the shoes. Friction material 21 is bonded to the shoes and engages the flange 13 of the drum 11 when the brake is applied. To effect such application, at least one, and herein two, electromagnets 23 are mounted on the lower end portion of a curved and substantially C-shaped operating arm 25. The latter is pivotally mounted between its ends on a bushed pin 26 (FIG. 1) on the backing plate 15 and includes an extension which carries a swivel block 27 disposed between the upper ends of the shoes 16 and 17 and pivoted on a pin 28 on the operating arm.

As shown, the two magnets 23 are spaced chordwise from one another on the lower end portion of the operating arm 25 and are telescoped over mounting pins 30 which are staked to the operating arm (see FIG. 2). When two electromagnets are employed, their mounting pins usually are spaced equidistantly from a plane extending perpendicular to the backing plate 15 and containing the axes of the pins 26 and 28. If a single magnet is used, its mounting pin is located with its axis disposed in such plane.

When excited by current supplied by a voltage source, the magnets 23 frictionally engage the plate 14 of the drum 11, which plate thus forms an armature for the magnets. If the drum 11 is rotating forwardly or clockwise (FIG. 1) when the magnets 23 are excited, frictional engagement between the armature 14 and the magnets will move the latter to the left and cause the operating arm 25 to turn clockwise on the pin 26 and push the swivel block 27 against the end of the brake shoe 16. The latter thus is forced outwardly into braking engagement with the flange 13 of the drum and acts through the adjustment screw 20 to force the shoe 17 outwardly. When the drum is rotating in a counterclockwise direction, excitation of the magnets causes the armature to shift the magnets to the right so as to turn the operating arm counterclockwise about the pin 26. Thus, the swivel block 27 pushes against the end of the brake shoe 17 and directly forces that shoe outwardly into engagement with the drum while the screw 20 forces the other shoe 16 outwardly.

To establish good contact between the armature 14 and each magnet 23, the latter is supported to float axially on its mounting pin 30 and is urged into light rubbing engagement with the armature by a coil spring 31 (FIG. 2) which is telescoped over the pin and is compressed between the outer side of the operating arm 25 and the inner face of the magnet. Also, the magnet is capable of limited pivotal floating on the pin 30 by virtue of the outer end of the pin being formed with an enlarged head 33 about which the magnet may rock. While it is desirable for the magnet to be capable of floating on the pin, rotation of the magnet about the axis of the pin should be restricted. For this purpose, each magnet is equipped with an anti-rotation bracket 34 (FIG. 2) whose outer end portion is secured to the magnet and whose inner end portion projects through a hole 35 in the operating arm 25. The inner end portion of the bracket engages the edges of the hole to keep the magnet from rotating on the pin.

Each electromagnet 23 comprises a generally cylindrical shell 40 (FIG. 2) made of powdered iron or the like and formed with a central hole 41 for receiving the mounting pin 30. An annular groove 43 is formed in the shell and opens out of the outer axially facing side thereof so as to receive an annular coil 44 which is formed by a multiple turn winding having leads 45 adapted to be connected to the voltage source. A ring 46 of friction material (e.g., similar to brake lining) also is disposed in the groove and usually is bonded to the shell 40.

As a result of the groove 43, the shell 40 is formed with inner and outer concentric rings which define inner and outer magnetic poles 47 and 48, respectively, of opposite polarity. When the coil 44 is energized, magnetic flux passes between the poles and through the armature 14 to draw the magnet into engagement with the armature. The outer face of the friction ring 46 also engages the armature to establish good frictional engagement between the magnet and the armature.

The present invention contemplates the provision of a new and improved electromagnet 50 (FIGS. 3 to 6) which is simple and easier to manufacture than prior electromagnets, which exhibits better performance and wear characteristics and which, in addition, may be used in the brake assembly 10 in place of two of the previously used electromagnets 23. The magnet of the invention is particularly characterized by its unique shape and by the manner in which its poles are formed.

Figure 6:
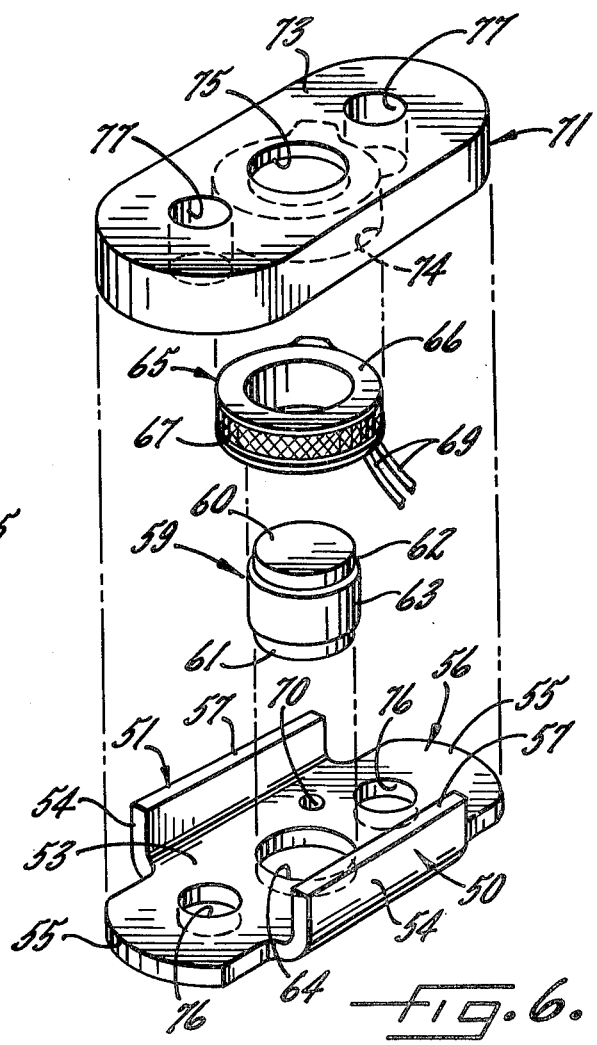
FIG. 6 is an exploded perspective view of the new magnet.

More specifically, the electromagnet 50 comprises a shell 51 (FIG. 6) made of a malleable, low reluctance material such as steel. In carrying out the invention, the shell is formed as a single-piece stamping from a sheet of steel in order to enable the shell to be made in a simple and inexpensive manner. As shown in FIG. 6, the shell is substantially U-shaped and is defined by a web 53 and by a pair of substantially identical, parallel flanges 54 bent from and disposed perpendicular to opposite side margins of the web. Two identical ears 55 are formed integrally with and project from opposite ends of the web 53. The ears are disposed in the same plane as the web 53, project beyond the ends of the flanges 54 and are herein formed with radiused ends. Together, the web 53 and the ears 55 define an oblong plate 56. The flanges 54 project from the longer margins of the plate 56 and are centered between the shorter margins of the plate.

Each flange 54 forms a magnetic pole having a pole face 57 (FIGS. 5 and 6) defined by the free edge of the flange. The two poles 54 are of like polarity and are disposed on opposite sides of and in spaced relation to a pole 59 of opposite polarity. In keeping with the invention, the latter pole is formed by a generally cylindrical stud which may be made quickly and easily on an automatic screw machine from round bar stock such as steel or other low reluctance material. One end 60 of the stud 59 defines a pole face and is located in the same plane as the pole faces 57 defined by the edges of the flanges 54.

The two end portions of the stud 59 are reduced in diameter as indicated at 61 and 62 (FIG. 6) so as to leave an enlarged section 63 midway between the ends of the stud. The end portion 61 of the stud is located within a hole 64 which is formed through the web 53 of the shell 51 at the geometric center of the web. The stud may be fixed within the hole by virtue of a light press fit or it may be brazed, bonded or staked to the web 53. Preferably, however, the end portion 61 of the stud fits loosely in the hole with a small amount of clearance so as to define an air gap for dissipating residual magnetic flux.

A coil 65 (FIG. 6) for producing magnetic flux is telescoped onto the enlarged section 63 of the stud 59 and rests on the web 53. The coil is of conventional circular construction and includes an annular bobbin 66 which supports a multiple turn winding 67 having lead wire 69 adapted to be connected to the voltage source. A small hole 70 is formed through the web 53 of the shell 51 to permit the lead wires to extend outwardly from the shell.

Figure 5:
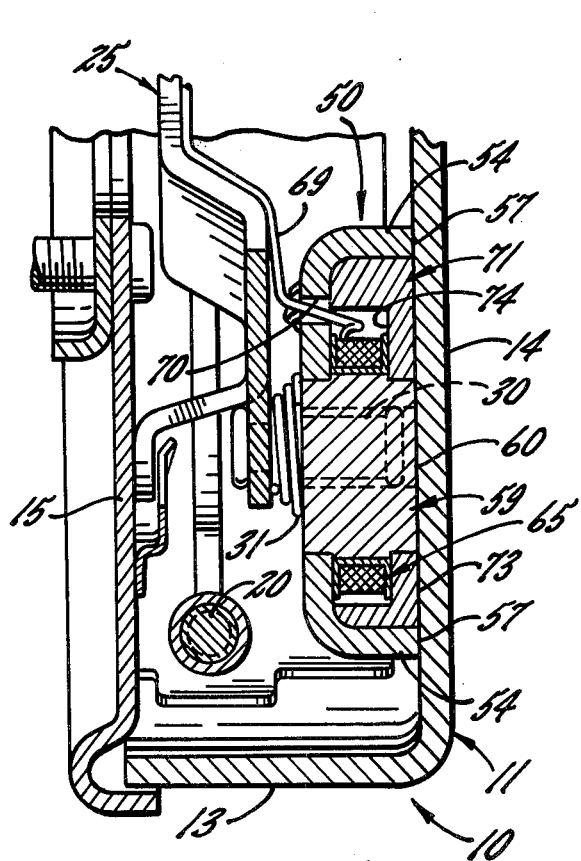

Completing the electromagnet 50 is a molded block 71 of suitable friction material such as that used for brake lining. The friction block is oval or oblong and corresponds substantially to the shape of the plate 56. One face of the block rests on the plate while the opposite or outer face 73 is disposed in substantially the same plane as the pole faces 57 and 60 and defines a friction face. The friction block substantially fills the space between the poles 54 and the pole 59. As shown in FIG. 5, a cavity 74 is formed in the friction block and receives the coil 65 to prevent the coil from shifting axially on the stud 59. In addition, a hole 75 is formed in the center of the friction block and receives the end portion 62 of the stud. The diameter of the hole 75 is somewhat smaller than the diameter of the enlarged mid-section 63 of the stud.

To assemble the electromagnet 50, the end portion 61 of the stud 59 first is slipped into the hole 64 in the web 53. Thereafter, the coil 65 is slipped over the enlarged section 63 of the stud. A suitable adhesive is then applied to appropriate surfaces of the friction block 71 and the latter is placed in the shell 51. When the adhesive cures, the block becomes securely bonded to the shell and serves to captivate the coil on the stud. The block also serves to captivate the stud in the hole 64.

Advantageously, the electromagnet 50 is adapted to be used in the brake assembly 10 in place of the two circular magnets 23. For this purpose, two holes 76 are formed through the plate 56, the holes being spaced equidistantly from the stud 59 and being substantially centered between the flanges 54. Two alined holes 77 are formed through the friction block 71. The spacing between the holes of each pair corresponds to the spacing between the mounting pins 30 of the brake assembly 10 and thus the single electromagnet 50 may be mounted on the pins so as to avoid the need to use two separate magnets. With the electromagnet 50 so mounted, the pole faces 57 and the longer dimension of the friction block 71 extend perpendicular to and are centered on the radial line which passes through the pivot 26 of the operating arm 25 of the brake assembly 10.

By comparing FIG. 3 with FIG. 1, it will be seen that the electromagnet 50 is of the same radial dimension as each of the circular electromagnets 23 and spans a chordal dimension which is equal to the overall chordal dimension spanned by the two magnets 23. Thus, the electromagnet 50 effectively requires no more physical mounting space than the two magnets 23. But, the total friction face area (i.e., the combined area of the pole faces 57 and 60 and the face 73 of the friction block 71) of the electromagnet 50 is substantially greater than the total friction face area of the two electromagnets 23. This is because the oblong magnet 50 spans and completely fills the hourglass-shaped empty space which exists between the two circular magnets.

Accordingly, the electromagnet 50 presents more friction area to the armature 14 of the brake assembly 10 and thus wears at a reduced rate. The oblong magnet 50 tends to engage the armature 14 in flat face-to-face relationship rather than tilting and digging into the armature and, as a result, the magnet tends to wear in a substantially uniform manner. Also, the ratio of the area of the friction face 73 of the friction block 71 relative to the area of the metal pole faces 57 is relatively large. As a result of that large ratio, the frictional performance characteristics of the magnet are improved since the overall coefficient of friction of the magnet is dependent to a larger degree upon the friction block 71, whose coefficient of friction is reasonably predictable and reasonably constant, and to a lesser degree upon the metal pole faces 57 whose coefficient of friction fluctuates from time-to-time by virtue of the pole faces becoming galled by the armature.

Thus the oblong electromagnet 50 provides several advantages in addition to the important advantage of low manufacturing cost. Even though the magnet 50 is oblong, it is capable of using an inexpensive coil 65 of conventional circular shape. Also, the magnet, by its very nature, is not capable of rotating around the mounting pins 30 and thus the anti-rotation brackets 34 and their attendant cost can be eliminated when the magnet is used in conjunction with a brake assembly having two mounting pins.

A modified magnet 50' is shown in FIG. 7 and is adapted for use with a brake assembly having only a single mounting pin. The magnet 50' is identical to the magnet 50 except that the plate 56' and the friction block 71' are not formed with holes which correspond to the holes 76 and 77. Instead, a hole 80 is formed through the center of the stud 59' and is adapted to receive the mounting pin of the brake assembly. A conventional anti-rotation bracket (not shown) may be attached to the magnet to prevent the latter from turning about the mounting pin.

Another modified electromagnet 81 is shown in FIGS. 8 and 9. In this instance, the shell of the magnet is defined simply by a flat, oblong plate 83 which may be stamped from sheet metal. A cylindrical stud 84 defining a magnetic pole of one polarity is fixed within a hole 85 formed through the center of the plate and supports an annular coil 86. Two poles of opposite polarity from the pole 84 are defined by two additional cylindrical studs 87 which are fixed in two additional holes 89 formed through the plate, the latter holes being centered between the long margins of the plate and being spaced equidistantly from the stud 84. An oblong friction block 90 is bonded to the platen and is formed with a cavity 91 for receiving the coil 86 and with holes 93 for receiving the studs 84 and 87. A hole 94 is formed through each of the studs 87 to enable the magnet 81 to be supported on the mounting pins 30 of the brake assembly 10.

A somewhat similar magnet 95 is shown in FIGS. 10 and 11 and includes a flat, oblong plate 96 formed with two holes 97. The latter are centered between the long margins of the plate and are offset relative to and spaced equidistantly from the center of the plate. Two studs 98 and 99 are fixed in the holes and define magnetic poles of opposite polarity, there being mounting holes 100 formed through the studs. A coil 101 is telescoped over the stud 98 and is captivated within the cavity 103 of a friction block 104 which is bonded to the plate 96. Holes 105 are formed through the friction block to receive the studs.

It should be appreciated that the magnets 50, 50', 81 and 95 are not limited to use in a brake assembly 10 for a vehicle wheel but can be used with other brakes having disc-type armatures. Also, it is possible for the magnets to be paired with one another on opposite sides of an armature to form a caliper disc brake.

We claim:

1. An electromagnet for use with a brake or the like, said electromagnet comprising a substantially oblong plate made of low reluctance magnetic material, a hole formed in said plate, a stud made of low reluctance magnetic material and located within said hole, said stud extending from and being disposed substantially perpendicular to said plate, an annular coil of substantially circular cross-section telescoped over said stud and having means adapted for connection to a voltage source, a block of friction material overlying said plate and corresponding substantially to the shape of said plate, a hole extending through said friction block and receiving said stud, a cavity within said friction block and receiving said coil to captivate said coil on said stud, said stud defining a magnetic pole of one polarity when said coil is excited by said voltage source, means made of low reluctance magnetic material and extending in the same direction as said stud, said means defining a magnetic pole of opposite polarity when said coil is excited, said poles being spaced from one another with the space between said poles being occupied by said friction block, and each of said poles having a pole face disposed substantially parallel to said plate and located in substantially the same plane as one face of said friction block.

2. An electromagnet as defined in claim 1 in which said stud is located substantially at the center of said plate.

3. An electromagnet as defined in claim 2 in which said means comprise a pair of flanges formed integrally with and projecting from the long margins of said plate, said flanges both projecting in the same direction from said plate and being located in spaced parallel planes disposed on opposite sides of said stud and extending substantially perpendicular to the plane of the plate.

4. An electromagnet as defined in claim 1 in which two additional holes are formed in said plate and are spaced equidistantly from opposite sides of said one hole in said plate, said means comprising two additional studs fixed within said additional holes in said plate, and additional holes in said friction block and receiving said additional studs.

5. An electromagnet as defined in claim 4 in which holes are formed through said additional studs and have axes which coincide with the axes of the additional studs.

6. An electromagnet as defined in claim 1 in which said means comprise an additional stud, both of said studs being centered between the long margins of said plate and being spaced equidistantly from the center of said plate, an additional hole in said plate, said additional stud being fixed in said additional hole, and an additional hole in said friction block and receiving said additional stud.

7. An electromagnet as defined in claim 6 in which holes are formed through said studs and have axes which coincide with the axes of the studs.

8. An electromagnet for use with a brake or the like, said electromagnet comprising a single-piece U-shaped shell made of low reluctance magnetic material and defined by a web and by a pair of parallel flanges disposed substantially perpendicular to the web, a hole formed in the center of said web, a substantially cylindrical stud made of low reluctance magnetic material and located within said hole, said stud projecting from said web in the same direction as said flanges, an annular coil of circular cross-section telescoped over said stud and having means adapted for connection to a voltage source, said coil being supported by said web and being located between the ends of said stud, a pair of ears formed integrally with and projecting from opposite ends of said web and being disposed in the same plane as the web, a block of friction material located between said flanges and overlying said web and said ears, a cavity within said friction block and receiving said coil to captivate the coil on said stud and against said web, a hole extending through said friction block and receiving said stud, the free ends of said flanges and the free end of said stud being disposed in substantially the same plane as one face of said friction block and defining magnetic pole faces when said coil is excited by said voltage source.

9. An electromagnet for use with a brake or the like, said electromagnet comprising a substantially oblong plate made of low reluctance magnetic material, a pair of substantially identical flanges formed integrally with and projecting from the long margins of said plate and centered between the short margins of the plate, said flanges both projecting in the same direction from said plate and being located in spaced parallel planes disposed substantially perpendicular to the plane of the plate, a substantially circular hole formed in the center of said plate and located between said flanges, a substantially cylindrical stud made of low reluctance magnetic material and located within said hole, said stud projecting from said plate in the same direction as said flanges and being located between said flanges, an annular coil of circular cross-section telescoped over said stud and having means adapted for connection to a voltage source, said coil being supported by said plate and being located between the ends of said stud, a block of friction material overlying said plate, said friction block corresponding substantially to the shape of said plate and being bonded to said plate, a cavity within said friction block and receiving said coil, a hole extending through said friction block and receiving said stud, the free ends of said flanges and the free end of said stud being disposed in substantially the same plane as one face of said friction block and defining magnetic pole faces when said coil is excited by said voltage source.

10. An electromagnet as defined in claim 9 in which said stud includes an enlarged midportion having a diameter greater than the diameter of the holes in said plate and said friction block, said stud having end portions smaller than said holes, said friction block being bonded to said plate and captivating said stud in the hole in said plate.

11. An electromagnet as defined in claim 9 in which two holes are formed through said plate and are located on opposite sides of said stud, and a pair of holes formed through said friction block and alined with said two holes in said plate.

12. An electromagnet as defined in claim 9 in which a hole is formed through said stud, the axis of said last-mentioned hole coinciding with the axis of said stud.

13. An electromagnet for use with a brake or the like, said electromagnet comprising a single-piece U-shaped shell made from a first piece of low reluctance magnetic material and defined by a generally rectangular web and by a pair of straight, parallel flanges disposed substantially perpendicular to said web, a stud made from a second piece of low reluctance magnetic material and located at the center portion of said web, said stud projecting from said web in the same direction as said flanges, an annular coil telescoped over said stud and having means adapted for connection to a voltage source, the free ends of said flanges and the free end of said stud being disposed in substantially the same plane and defining magnetic pole faces when said coil is excited by said voltage source.

* * * * *